Jan. 31, 1939.  B. F. HAZELTON, JR  2,145,351
HOLLOW GLASS BUILDING BLOCK
Filed Sept. 11, 1936
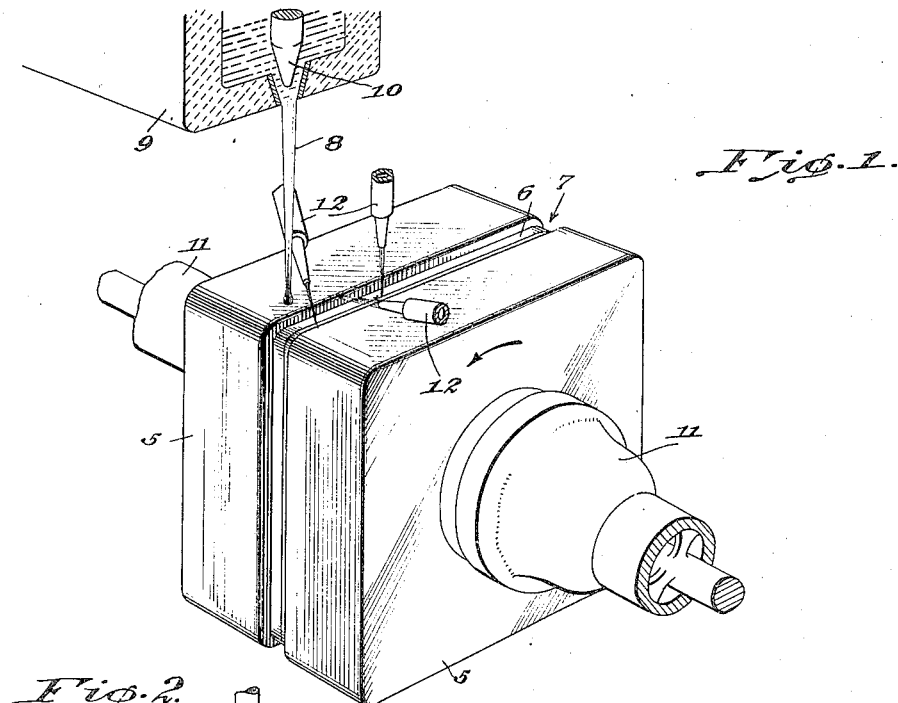
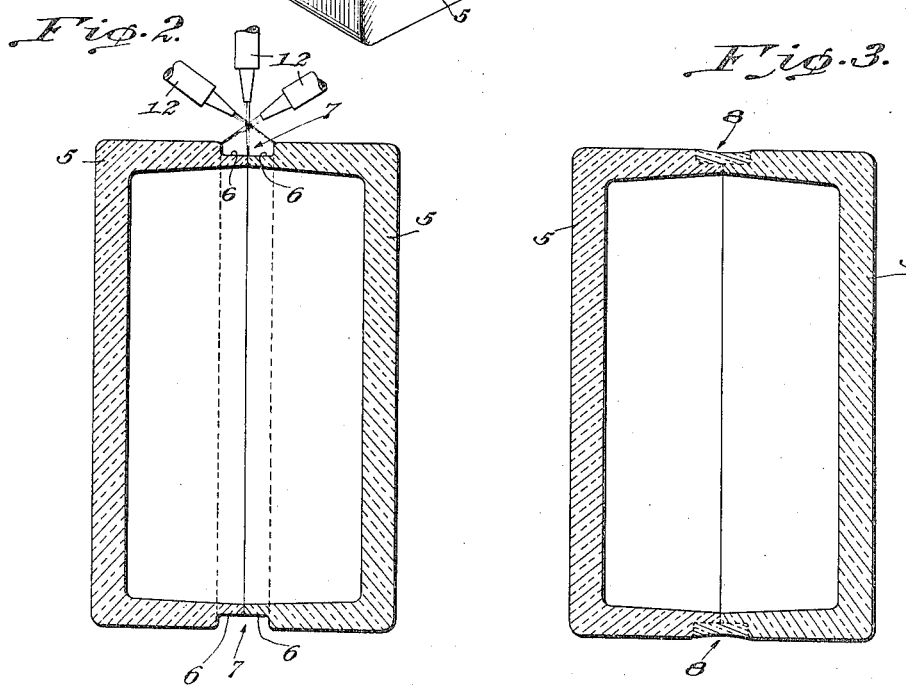
INVENTOR.
B. F. Hazelton, Jr.,
BY Rule & Hoge
ATTORNEYS.

Patented Jan. 31, 1939

2,145,351

UNITED STATES PATENT OFFICE 2,145,351

HOLLOW GLASS BUILDING BLOCK

Benjamin F. Hazelton, Jr., Toledo, Ohio, assignor to Owens-Illinois Glass Company, a corporation of Ohio Application September 11, 1936, Serial No. 100,326

2 Claims. (Cl. 49—82)

The present invention relates to an improved method of forming hollow glass building blocks and more particularly to a novel means for bonding half-block sections together to form a complete block. Heretofore various methods of bonding the block sections together have included preheating each section and immersing the edges thereof in a bath of a molten metallic alloy and then joining the sections at their edges while the metal is still in a plastic state, after which the blocks are allowed to cool. Proper temperature relation between the metal and glass must be maintained constantly to insure an adequate cohesion between the elements. It is an object of this invention to form complete building blocks by fusing the half-sections together by an application of a vitreous bonding material to the edges to be joined.

The affinity of glass for glass in a plastic state is well established in fact, and it is the purpose of this invention to utilize this feature by directing a stream of molten glass against the preheated edges of a pair of glass block sections to form the complete block, although metal such as aluminum or aluminum silicon alloy may well be employed. To this end the invention involves the provision of a channel at the meeting edges of the block sections, a portion of which is formed in each section, and into which a thread of molten glass may be introduced after the walls of the channel have been heated to a plastic state by the application of localized flame thereto.

Other advantages and features of novelty will become apparent during the course of the following description.

In the accompanying drawing:

Fig. 1 is a fragmentary perspective view showing a pair of glass block sections in position to receive a thread of molten glass for bonding them together, portions of the apparatus therefor being shown diagrammatically;

Fig. 2 is a vertical sectional view through a pair of glass block sections illustrating the manner of preheating the edges thereof; and Fig. 3 is a vertical sectional view through a completed glass block.

Referring to Figs. 1 and 2 of the drawing, a pair of glass building block sections 5 are shown in position to be bonded together. The block sections may be formed in any suitable manner according to commercial methods of manufacture, and each section is provided with a continuous outwardly facing shoulder 6 providing a continuous external recess around the rim of the section. When the sections are placed side by side in bonding position, the recesses form an annular channel 7 adjacent the meeting edges of the block sections. At the time the block sections are discharged from the forming machine, they may vary in temperatures over a wide range of approximately 700° to 1000° F., which may well be substantially maintained throughout the bonding process.

The formed block sections are placed on a suitable conveying apparatus (not shown) and brought into position to receive a bonding ribbon 8 or thread of molten glass as it issues from a feeder boot 9 or forebay of a glass melting furnace. The feeder 9 may be of any standard commercial design capable of discharging a continuous flow of glass, and in which the temperature and rate of flow may be adjustably controlled. An adjustable plunger 10 mounted within the forebay regulates the flow of glass which is maintained at a relatively high temperature, approximately 1900° to 2100° F. The block sections are held together in position to be united between holders 11 or chucks, forming a part of the conveyor, in a manner to revolve the blocks and successively present the four sides thereof to the flowing stream of glass.

Concentrated flames from a series of burners 12 or nozzles are directed into the channel and at the shoulders at varying angles to raise the temperature of the glass block sections to fusing heat within a localized area prior to the application of the molten glass thereto. The flame is illustrated as being directed mainly at the exposed edges of the channel to soften the excessively chilled areas created by contact of the forming mold with the glass, as will be understood by persons skilled in the manufacture of glass articles.

As the paired block sections reach the bonding station, the holders 11 are rotated and flame from the burners 12 directed into the channel 7. When the glass reaches the required temperature, which is sufficiently high to permit requisite cohesion with the descending ribbon 8, the thread of glass is directed into the channel and immediately fuses with the walls and bottom thereof. Continued rotation of the block presents the sides thereof in succession at the heating zone of the burners where the channel walls and bottom thereof are heated prior to contact with the thread 8. When the bonding of the block is completed, the stream of glass is severed by means not shown, and the conveyor indexed to bring the succeeding block into bonding position. The quantity of glass deposited within the channel is regulated to prevent overflowing, which would tend to form a rib around the block and thereby produce unsatisfactory results in "laying" them.

After the welding operation, the completed blocks are placed in an annealing leer from which they emerge as a finished commercial product. By sealing the block sections together while heated to a relatively high degree, a partial vacuum is created within the interior thereof which, when the blocks have cooled, prevents the formation of vapor which would cloud the interior of the block and present a poor appearance.

It is to be understood that the foregoing is to be taken as the preferred form of my invention and that various changes in the arrangement of and manner of application of the various features may be effected without departing from the spirit of the invention or the scope of the appended claims.

I claim:

1. The method of forming a hollow glass building block which consists in molding complementary cup-like sections each having a continuous external recess formed at the rim thereof, bringing the rim portions of the sections together in accurate alignment under pressure prior to any appreciable loss of residual heat from the molding operation, thus providing a continuous external groove between the sections in the vicinity of the meeting edges thereof, reheating the side and bottom walls of the groove, and flowing a stream of molten glass into the groove while simultaneously rotating the sections to wrap the stream around the sections in the groove.

2. The method of forming a hollow glass building block which consists in molding complementary cup-like sections each having a continuous external recess formed at the rim thereof, bringing the rim portions of the sections together in accurate alignment under pressure prior to any appreciable loss of residual heat from the molding operation, thus providing a continuous external groove between the sections in the vicinity of the meeting edges thereof, reheating the side and bottom walls of the groove, and filling the groove with molten glass.

BENJAMIN F. HAZELTON, Jr.